United States Patent Office 2,902,467
Patented Sept. 1, 1959

2,902,467

SILOXANE-SILICATE ELASTOMERS

Alan D. Chipman, Bay City, Mich., assignor to Dow Corning Corporation, Midland, Mich., a corporation of Michigan No Drawing. Application October 21, 1957
Serial No. 691,176

2 Claims. (Cl. 260—46.5)

This invention relates to the use of certain silicates for accelerating the cure of room temperature-vulcanizing organopolysiloxane elastomers.

Since there first originated the concept of a siloxane elastomer which could be cured at room temperature, there has been a constant search for the most advantageous system. One of the first systems involved the incorporation of an alkyl silicate into polymeric siloxanes containing acid groups such as sulphate and phosphate radicals as described in U.S. Patent 2,571,039. This system, containing relatively corrosive materials, was improved upon in the system of Keith E. Polmanteer disclosed in his copending application Serial No. 632,630, filed January 7, 1957. This Polmanteer system consists of mixing together acid-free diorganopolysiloxanes, hydrocarbonoxy silicates and metallic carboxylic acid salt catalysts to produce an excellent bubble-free elastomer with no corrosive materials or conditions. However, the time for curing at room temperature with both systems may range up to 3 days. This is obviously a handicap to some production uses.

In an effort to reduce the necessary curing time of these elastomers a different type of system was presented by Robert R. Selfridge in his copending application Serial No. 554,636, filed December 22, 1955. A cured elastomer is obtained therein by mixing a hydroxylated diorganopolysiloxane with a small amount of an organohydrogensiloxane. This method can accomplish a complete cure in as little as 5 minutes. However, during vulcanization hydrogen gas is given off which, though immaterial for elastomers in thin section, often creates bubbles in elastomeric thick sections.

By the instant method applicant has achieved a fast cure at room temperature with non-corrosive materials to produce bubble-free siloxane elastomers. Whereas the silicates employed in this invention have been employed as surface primers for siloxane adhesion purposes as shown in U.S. Patent 2,643,964, no one has ever employed this type of silicate as a curing agent.

This invention relates specifically to a method for curing a room temperature-vulcanizable organopolysiloxane elastomer which comprises mixing together (1) an organopolysiloxane of at least 100 cs. viscosity at 25° C., said siloxane containing silicon-bonded hydroxyl groups and being composed of polymer units of the formula

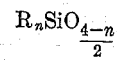

in which each R is selected from the group consisting of monovalent hydrocarbon radicals and monovalent halogenated hydrocarbon radicals and $n$ has an average value from 1.99 to 2 inclusive, (2) from 0.2 to 10% by weight based on the weight of siloxane (1) of a compound selected from the group consisting of silicates of the formula $R'_{4-m}Si(OCH_2CH_2OR'')_m$, in which each R' is selected from the group consisting of monovalent hydrocarbon radicals of less than 7 carbon atoms and monovalent halogenohydrocarbon radicals of less than 7 carbon atoms, each R'' is a monovalent aliphatic hydrocarbon radical of less than 6 carbon atoms and each $m$ has a value of from 3 to 4, and partial hydrolyzates of said silicates, and (3) from 0.01 to 10% by weight based on the weight of siloxane (1) of a catalyst of the group consisting of carboxylic acid salts of metals ranging above hydrogen in the electromotive series of metals, in which salts each acid radical has less than 16 carbon atoms.

Siloxane (1) contains silicon-bonded hydroxyl radicals attached either along the siloxane chains or at the molecular chain ends. Preferably, the hydroxyl groups are on each end of each of the siloxane molecules. Furthermore, siloxane (1) is substantially a diorganosiloxane. It can contain small amounts of monoorganosiloxane units but is preferably substantially free from triorganosiloxane units. The organic radicals (R) attached to the silicon atoms of siloxane (1) can be any combination of monovalent hydrocarbon radicals and/or monovalent halogenohydrocarbon radicals.

Specific examples of R groups which are operative in this invention are alkyl groups, such as methyl, ethyl, tert-butyl and octadecyl, alkenyl groups, such as vinyl, allyl and butadienyl, cycloalkyl groups, such as cyclobutyl, cyclopentyl, cyclohexyl and undecahydrobiphenyl, cycloalkenyl groups, such as cyclopentenyl, cyclohexenyl and dicyclopentadienyl, aryl groups, such as phenyl, xenyl and naphthyl, aralkyl groups, such as benzyl and xylyl, and alkaryl groups, such as tolyl. R can also be any of the above types of radicals with halogen atoms attached thereto, e.g. chloromethyl, bromophenyl, tetrafluoroethyl, trifluorotolyl, heptachloroxenyl, chlorodifluorovinyl, chlorohexafluorocyclopentenyl, 1,3-dibromopropyl and α-chloro-α,β,β-trifluorocyclobutyl.

Siloxane (1) can be a homopolymer, i.e. only one species of siloxane unit present, or a copolymer containing two or more different species of siloxane units. Siloxane (1) can also be a mixture of any combination of homopolymers and/or copolymers with the stipulation that each polymer ingredient in the mixture must satisfy the limitations set on siloxane (1). In siloxane (1) each silicon atom can have attached to it one type of R radical or different types of R radicals.

The polymeric siloxanes which are employed in this invention can range in viscosity from 100 cs. up. Thus, the polymers can be thin liquids or nonflowing benzene-soluble gums or insoluble gels. The particular physical state of the polymer will vary depending upon the end use of the elastomer. For instance, fluid polymers having viscosities in the range of from 2,000 to 25,000 cs. are preferred for such applications as coating and potting. On the other hand when excellent stress-strain characteristics are desired, high molecular weight nonflowing soluble gums are preferable. In general, it is preferable that the polymers be soluble.

The silicate (2) employed in the method of this invention can contain any organic radicals within the specific limitations set forth. For instance, R' can be such groups as methyl, ethyl, iso-hexyl, phenyl, vinyl, allyl, butadienyl, cyclopentenyl and cyclohexyl. R' can also be the corresponding halogenated groups, such as chloromethyl, 2-bromo-4,6-diiodophenyl, 1,2-difluorovinyl, 3,4-dichlorocyclopentyl, 2-bromocyclopentene-2,3-yl and 6-chlorohexyl.

In the hydrocarbonoxy radicals of the formula —(OCH₂CH₂OR'') each R'' can be any of such groups as methyl, ethyl, isopropyl, tert-butyl, pentyl, vinyl, allyl, methallyl and butadienyl. The silicate is produced by reacting a chlorosilane with the corresponding monoethers of ethylene glycol or mixtures thereof to produce HCl and the silicate. The monoethers of ethylene glycol are produced by the normal ether reactions of the corresponding alcohols (R''OH) with ethylene glycol in a 1:1 addition. It is possible then to have more than one species of the group —(OCH₂CH₂OR″) on each silicate silicon.

The term "silicates" employed herein includes monoorganotrihydrocarbonoxysilanes, tetrahydrocarbonoxysilanes (i.e. orthosilicates), and partial hydrolyzates of such silanes commonly known as polysilicates. These polysilicates are polymeric materials in which the silicon atoms are linked through SiOSi linkage, the remaining valences of the silicon being satisfied by R′ and —(OCH₂CH₂OR″) radicals where R′ and R″ are as above defined.

The silicate component (2) then can be one silicate or any combination of the silicates described above. If, however, the total weight of these silicates is below 0.2% based on the weight of siloxane (1), they will be ineffective. On the other hand, if the total weight of these silicates is above 10% based on the weight of siloxane (1), no further appreciable shortening of curing time will be noticed.

The effect of the above-described silicates can be diluted simply by mixing them with the silicates previously employed in the art. These include such silicates as n-propylorthosilicate, amylorthosilicate, allylorthosilicate, pentenylorthosilicate, diethyldipropylorthosilicate, hexylorthosilicate, methylpolysilicate, ethylpolysilicate, isopropylpolysilicate, sec-amylpolysilicate, n-butylpolysilicate and mixtures thereof. These silicates can be present in amounts up to 50% by weight based on siloxane (1) as shown in the aforementioned Polmanteer application, but when these miscellaneous silicates are mixed with the silicates (2) claimed in the method of this invention, the effect of the silicates (2) is minimized.

The curing of the compositions of this invention is brought about by combining the polysiloxane, the silicate and a curing catalyst comprising a carboxylic acid salt of the metals ranging above hydrogen in the electromotive series of metals. Specifically, the metals included are lead, tin, nickel, cobalt, iron, cadmium, chromium, zinc, manganese, aluminum, magnesium, barium, strontium, calcium, cesium, rubidium, potassium, sodium and lithium. Any carboxylic acid salt of these metals is operative in this invention provided the carboxylic acid radical contains less than 16 carbon atoms. It is preferable that the salt be soluble in the siloxane although insoluble salts may be employed if they are properly dispersed in the system. The dispersion may be carried out by employing a solution of the catalyst in a mutual solvent with the siloxane, or the catalyst may be dispersed on a filler and thereafter milled into the siloxane.

The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate, zinc naphthenate and sodium naphthenate, salts of fatty acids such as iron 2-ethylhexoate, lead 2-ethylhexoate and chromium octoate, salts of aromatic carboxylic acids such as dibutyl tin dibenzoate, salts of polycarboxylic acids such as dibutyl tin adipate and lead sebacate and salts of hydroxy carboxylic acids such as dibutyl tin dilactate.

In general, the amount of catalyst employed can be varied from .01 to 10% based upon the weight of the siloxane. A mixture of two or more of the defined salts may be employed if desired. The amount of catalyst varies from compound to compound depending upon the activity of the specific compound in question. Also the amount of catalyst can be varied depending upon the particular use for the product. For example, when a particularly fast cure is desired, more catalyst can be employed. If one wishes to delay the cure, for example, in applications where extensive fabrication time is required less catalyst is used. In general, catalyst concentrations of from .2 to 2% based on the weight of the siloxane are sufficient.

Thus, the rate of cure can be affected by variations in the types and amounts of silicates employed and/or by variations in the types and amounts of catalyst.

If desired, fillers can be incorporated into the elastomers of this invention. Suitable fillers include organic materials such as cork, wood flour, cotton linters and organic fabrics or inorganic fillers such as calcium carbonate, titania, carbon black and silica powders. The latter fillers are preferred in those applications requiring high temperature stability. If employed, the amount of filler may range from 10 to 300 or more parts by weight based on the weight of siloxane (1).

The elastomers of this invention may be compounded in the usual manner for compounding siloxane elastomers. If the materials are to be stored prior to use, it is necessary that the carboxylic acid salt or the silicate be stored separately. In other words, one may compound the polymer, filler and silicate and add the carboxylic acid salt just prior to use or one may compound the polymer, filler and carboxylic acid salt and then add the silicate just prior to use.

The term "mixing" as used herein is intended to include both regular compounding and the surface mixing resulting from a surface application of the silicate (2). The latter method is particularly valuable where a fast surface cure is desirable. Whereas silicates employed previously in the art for curing would seep through a surface and diffuse into the body of the polysiloxane vulcanizing the whole polymer, the silicates (2) of the method of this invention will stay primarily in the polymer surface area.

Therefore, in an application such as the taking of dental impressions a room temperature-vulcanizable silicate-type siloxane elastomer having a comparatively long working time can be molded and subsequently coated with a silicate (2) whereby the impression will be made permanent almost immediately while the remainder of the casting cures more slowly. The silicate (2) can be applied by brushing or spraying the silicate alone or in solution in some inert organic solvent such as xylene.

Curing of the elastomers of this invention takes place spontaneously at room temperature upon mixing the defined ingredients, i.e. siloxane, silicate and catalyst. The elastomer will cure to an unworkable state in less than five minutes. The term "working time" includes that period of time when the elastomer is sufficiently plastic to be easily moldable or "worked." It is to be understood, of course, that if desired, the elastomers of this invention can be cured in a press at temperatures of 150° C. to 250° C. The products can be hot or cold molded and extruded, although in carrying out extrusion operations care should be taken that the curing does not advance too far prior to extrusion.

The materials of this invention have heat stabilities comparable with that of previously-known siloxane elastomers. This is exhibited by little reduction of physical properties after heating at 250° C. and also by low weight loss during heating. Furthermore, the stress-strain properties of some of the elastomers of this invention are far superior to those of any known siloxane elastomer.

The elastomers of this invention are useful for electrical insulation, for sealing of voids and for any other use where elastomeric products are needed.

The term "comprising" as employed in the claims means that the materials of this invention contain three essential ingredients, namely the defined polysiloxanes, silicates and carboxylic acid salts but that the claims include within their scope nonessential ingredients such as oxidation inhibitors, compression set additives, pigments, fillers and other specialized ingredients normally employed in siloxane elastomers.

The following examples are illustrative only and should not be construed as limiting the invention which is properly delineated in the appended claims. In all of the examples the parts are parts by weight. It should be noted that differences in silicate proportions, silicate purity and the mode of silicate preparation have a relatively small effect on the short curing time of the system.

EXAMPLE 1

Each of the formulations listed below consisted of 100 parts by weight of a dimethylpolysiloxane fluid of 15,000 cs. viscosity which was essentially free of triorganosiloxy endblockers and contained silicon-bonded OH groups, 30 parts by weight of diatomaceous earth, 0.5 part by weight of lead octoate and a silicate in the amount shown. The lead octoate was added as a mixture of 100 parts by weight of a dimethylpolysiloxane fluid of 12,500 cs. viscosity which was essentially free of silicon-bonded hydroxyl groups, 30 parts by weight of diatomaceous earth, 2 parts of ferrous oxide and 31 parts of lead octoate.

*Table I*

| | Silicate | Amount, Parts by Wt. | Plasticity after (Hours) | | | | | | | Working Time (min.) | Durometer after 24 hrs. |
|---|---|---|---|---|---|---|---|---|---|---|---|
| | | | 0 | ½ | 1 | 2 | 4 | 8 | 24 | | |
| I | Crude Si(OCH$_2$CH$_2$OCH$_3$)$_4$ | 1.5 | | | Set up in 5 minutes | | | | | <5 | |
| II | Crude Si(OCH$_2$CH$_2$OCH$_3$)$_4$ | 3.0 | | | Set up in 5 minutes | | | | | <5 | |
| III | Distilled Si (OCH$_2$CH$_2$OCH$_3$)$_4$ | 2.0 | 031 | 088 | 095 | 122 | 165 | | 365 | 2 | 34 |
| IV | CH$_3$Si(OCH$_2$CH$_2$OCH$_3$)$_3$ | 2.0 | 016 | 115 | 202 | 365 | 402 | | | 5 | 31 |
| V | Ethylpolysilicate | 1.5 | 011 | | 035 | 112 | 198 | 273 | | 40 | 38 |
| VI | Ethylorthosilicate | 1.5 | 011 | | 014 | 062 | 151 | 312 | | 56 | 16 |
| VII | n-propylorthosilicate | 1.5 | 011 | | 010 | 017 | 072 | 190 | 268 | 100 | 21 |
| VIII | n-amylorthosilicate | 1.5 | 007 | | | | 011 | 032 | 245 | 120+ | 22 |
| IX | n-allylorthosilicate | 1.5 | 008 | | | | | 140 | 310 | <75 | 42 |
| X | n-butylorthosilicate | 1.5 | 007 | | | | 012 | 038 | 275 | 120+ | 24 |
| XI | n-propylpolysilicate | 1.5 | 007 | | 006 | 008 | 008 | 012 | 073 | 240+ | 15 |
| XII | n-propylpolysilicate | 3.0 | 007 | | 006 | 008 | 008 | 022 | 157 | 240+ | 24 |
| XIII | O[Si(OCH$_2$CH$_2$OCH$_3$)$_3$]$_2$¹ | 2.0 | 008 | 231 | 316 | 350 | 398 | | | 1 | 33 (12 hrs.) |
| XIV | Si(OCH$_2$CH$_2$OCH$_3$)$_4$² | 2.0 | 027 | 093 | 130 | 155 | 271 | | | 2-3 | 33 (12 hrs.) |
| XV | Si(OCH$_2$CH$_2$OC$_2$H$_5$)$_4$ | 1.5 | 033 | 135 | 173 | 213 | 230 | | | 2 | 33 |
| XVI | Si(OCH$_2$CH$_2$OC$_2$H$_5$)$_4$ | 3.0 | 031 | 099 | 195 | 247 | 270 | | | 2 | 38 |

¹ The dimer hydrolyzate of Si(OCH$_2$CH$_2$OCH$_3$)$_4$.
² Produced by transesterification of ethylorthosilicate.

EXAMPLE 2

When the following catalysts were substituted for the lead octoate in Example 1, effective cures for each system were attained:

Lead 2-ethylhexoate, dibutyl tin diacetate, dibutyl tin di-2-ethylhexoate, dibutyl tin dilaurate, butyl tin tri-2-ethylhexoate, iron 2-ethylhexoate, cobalt 2-ethylhexoate, sodium naphthenate and zinc 2-ethylhexoate.

EXAMPLE 3

When the following siloxanes are substituted for the 15,000 cs. viscosity dimethylpolysiloxane fluid in Example 1, similar rates of cure are evident:

A 2,000 cs. copolymer of 7.5 mol percent phenylmethylsiloxane and 92.5 mol percent dimethylsiloxane, which polymer is free of triorganosilyl end groups
100,000 cs. ethylmethylpolysiloxane
100,000 cs. diethylpolysiloxane
A 100,000 cs. copolymer of 90 mol percent dimethylsiloxane and 10 mol percent trifluorotolylmethylsiloxane
A 100,000 cs. copolymer of 90 mol percent dimethylsiloxane and 10 mol percent α-chloro-α,β,β-trifluorocyclobutylmethylsiloxane
100,000 cs. octadecylmethylsiloxane
100,000 cs. vinylmethylsiloxane
A 100,000 cs. copolymer of 95 mol percent dimethylsiloxane and 5 mol percent diphenylsiloxane

EXAMPLE 4

When any of the following silicates are substituted for the silicates of this invention employed in Example 1, similar fast cures result:

Si(OCH$_2$CH$_2$OCH=CH$_2$)$_4$
Si(OCH$_2$CH$_2$OCH$_2$CH$_2$CH$_2$CH$_3$)$_4$
PhSi(OCH$_2$CH$_2$OCH$_3$)$_3$

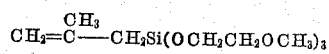

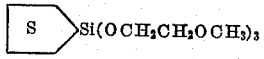

CF$_3$CH$_2$CH$_2$Si(OCH$_2$CH$_2$OCH$_3$)$_3$

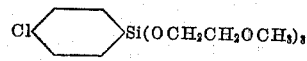

That which is claimed is:

1. A method for curing a room temperature-vulcanizable organopolysiloxane which comprises mixing together (1) an organopolysiloxane of at least 100 cs. viscosity at 25° C., said siloxane containing silicon-bonded hydroxyl groups and being composed of polymer units of the formula $$R_nSiO_{\frac{4-n}{2}}$$

in which each R is selected from the group consisting of monovalent hydrocarbon radicals and monovalent halogenated hydrocarbon radicals and $n$ has an average value from 1.99 to 2 inclusive, (2) from 0.2 to 10% by weight based on the weight of siloxane (1) of a compound selected from the group consisting of silicates of the formula R'$_{4-m}$Si(OCH$_2$CH$_2$OR'')$_m$, in which each R' is selected from the group consisting of monovalent hydrocarbon radicals of less than 7 carbon atoms and monovalent halogenohydrocarbon radicals of less than 7 carbon atoms, each R'' is a monovalent aliphatic hydrocarbon radical of less than 6 carbon atoms and each $m$ has a value of from 3 to 4, and partial hydrolyzates of said silicates, and (3) from 0.01 to 10% by weight based on the weight of siloxane (1) of a catalyst of the group consisting of carboxylic acid salts of metals ranging above hydrogen in the electromotive series of metals, in which salts each acid radical has less than 16 carbon atoms and thereafter allowing the mixture to cure.

2. The method in accordance with claim 1 wherein (1) is a methylsiloxane and (2) is Si(OCH$_2$CH$_2$OCH$_3$)$_4$.

References Cited in the file of this patent

UNITED STATES PATENTS

| | | |
|---|---|---|
| 2,449,572 | Welsh | Sept. 21, 1948 |
| 2,460,457 | Hyde | Feb. 1, 1949 |
| 2,559,342 | Burkhard | July 3, 1951 |
| 2,643,964 | Smith-Johannsen | June 30, 1953 |
| 2,692,844 | Hyde | Oct. 26, 1954 |
| 2,744,878 | Smith-Johannsen | May 8, 1956 |
| 2,759,904 | Talcott | Aug. 21, 1956 |